(12) United States Patent
Cuculo et al.

(10) Patent No.: US 9,080,258 B2
(45) Date of Patent: Jul. 14, 2015

(54) PROCESS OF MAKING HIGHLY ORIENTED AND CRYSTALLINE THERMOPLASTIC FILAMENTS

(75) Inventors: John A. Cuculo, Raleigh, NC (US); Richard Kotek, Raleigh, NC (US); Peng Chen, Zhejiang (CN); Mehdi Afshari, Raleigh, NC (US); Ferdinand Lundberg, Garner, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 13/383,076

(22) PCT Filed: Jul. 9, 2010
(Under 37 CFR 1.47)

(86) PCT No.: PCT/US2010/041566
§ 371 (c)(1),
(2), (4) Date: Jun. 25, 2012

(87) PCT Pub. No.: WO2011/006092
PCT Pub. Date: Jan. 13, 2011

(65) Prior Publication Data
US 2013/0040521 A1      Feb. 14, 2013

Related U.S. Application Data

(60) Provisional application No. 61/224,527, filed on Jul. 10, 2009.

(51) Int. Cl.
*D01D 5/08*      (2006.01)
*D01D 5/16*      (2006.01)
(Continued)

(52) U.S. Cl.
CPC ............... *D01D 5/084* (2013.01); *D01D 5/12* (2013.01); *D02J 1/223* (2013.01); *D02J 1/228* (2013.01)

(58) Field of Classification Search
CPC .............. D01D 5/08; D01D 5/12; D01D 5/16; D02J 1/223; D02J 1/228

USPC ........ 264/178 F, 178 R, 179, 180, 181, 210.7, 264/210.8
See application file for complete search history.

(56) References Cited

U.S. PATENT DOCUMENTS 3,993,828 A      11/1976  McCorsley, III
5,019,316 A  *    5/1991  Ueda et al. ................ 264/178 F
(Continued)

FOREIGN PATENT DOCUMENTS

EP      0588302 A1      3/1994
EP      0992529 A2      4/2000
(Continued)

OTHER PUBLICATIONS

Chen et al., The Direct Formation and Characterization of a Unique Precursor Morphology in the Melt-Spinning of Polyesters, Macromoleculres, 42 (15) 5437, 5 pages (2009).
(Continued)

*Primary Examiner* — Leo B Tentoni
(74) *Attorney, Agent, or Firm* — Additon, Higgins & Pendleton, P.A.

(57) ABSTRACT

A melt-spun highly oriented and crystalline thermoplastic filament or fiber having a tenacity of at least about 10 g/d, an elongation less than about 15-%, and a modulus of at least about 130 g/d. A method of making highly oriented and crystalline thermoplastic filaments has been developed that comprises extruding a thermoplastic polymer to form at least one molten filament. The at least one molten filament is introduced into a horizontal liquid isothermal bath. The bath is maintained at a temperature between the glass transition temperature and the melting temperature of the thermoplastic polymer. The bath increases the tension along the molten filament to form at least one partially oriented and low crystalline filament. The partially oriented filament is drawn to form the highly oriented and crystalline filament.

44 Claims, 5 Drawing Sheets

(51) Int. Cl.
  *D01D 5/084* (2006.01)
  *D02J 1/22* (2006.01)
  *D01D 5/12* (2006.01)

(56) References Cited

U.S. PATENT DOCUMENTS

| | | | |
|---|---|---|---|
| 5,139,729 A * | 8/1992 | Clark et al. | 264/289.6 |
| 5,149,480 A | 9/1992 | Cuculo et al. | |
| 5,171,504 A | 12/1992 | Cuculo et al. | |
| 5,268,133 A | 12/1993 | Cuculo et al. | |
| 5,324,816 A * | 6/1994 | Khanna et al. | 528/481 |
| 5,405,696 A | 4/1995 | Cuculo et al. | |
| 5,453,321 A * | 9/1995 | Choe et al. | 428/364 |
| 5,733,653 A | 3/1998 | Cuculo et al. | |
| RE35,972 E | 11/1998 | Cuculo et al. | |
| 5,882,793 A | 3/1999 | Shida et al. | |
| 5,906,891 A | 5/1999 | Shida et al. | |
| 6,036,895 A * | 3/2000 | Budenbender et al. | 264/210.7 X |
| 6,080,482 A | 6/2000 | Martin et al. | |
| RE37,526 E * | 1/2002 | Flint et al. | 428/364 |
| 6,613,254 B1 | 9/2003 | Shiffer | |
| 2005/0019565 A1 | 1/2005 | Morin et al. | |

FOREIGN PATENT DOCUMENTS

| | | |
|---|---|---|
| EP | 0828871 B1 | 7/2003 |
| GB | 828 986 A1 | 2/1960 |
| GB | 1 506 565 | 4/1978 |
| JP | 2005163231 A * | 6/2005 |

OTHER PUBLICATIONS

Ihm et al., Properties of Polyethylene terephthalate) Extrudate Prepared by Hyperbolic Convergent Flow and High Pressure, Journal of Polymer Science: Part B: Polymer Physics, vol. 25, pp. 2331-2343 (1987).

Wu et al., The Effect of a Liquid Isothermal Bath in the Threadline on the Structure and Properties of Poly(ethylene terephthalate) Fibers, Journal of Applied Polymer Science, vol. 55, pp. 1275-1289 (1985).

NCSU Researchers Develop Process to Make World's Strongest Polyester Fibers, (2009) accessed at http://www.textile world.com/Articles/2009/January/News/Janetxs_story.html.

International Search Report of counterpart Application No. PCT/US20101041566 mailed Feb. 23, 2011.

* cited by examiner

PROCESS OF MAKING HIGHLY ORIENTED AND CRYSTALLINE THERMOPLASTIC FILAMENTS

The present invention is related to a method of forming thermoplastic filaments, and particularly to a method for forming melt-spun highly oriented low crystalline precursor filaments and melt-spun highly oriented crystalline filaments produced from same.

BACKGROUND

With the increasingly fierce competition in the synthetic fiber market, it is important to operate at a high performance to cost ratio. This has been done before by: a) improving the fiber properties (performance) by the development of the dry jet wet-spinning of aramids (e.g., Kevlar™) or gel-spinning of polyethylene (e.g., Spectra™), or b) reducing the production cost via high-speed spinning in the melt-spinning process of thermoplastic polymers. Polyolefins, polyesters, and polyamide fibers have been typically produced using a melt-spinning or the melt spin-draw process. Efforts have been made to improve the fiber performance in this relatively inexpensive process, but the properties of the melt-spun fibers are typically much below those of the wet- or gel-spun fibers.

Melt-spun fibers, however, with physical properties that are comparable to those resulting from wet or gel spinning techniques, have been attempted, but with little success. These processes come with numerous expenses, for example, capital expenditure for appropriate polymer handling, plant space, manpower and storage facilities. Yet despite advances in polymer science to date, melt-spun fibers having a tenacity and modulus typical of, or even intermediate to, the tenacity and modulus of high performance fibers such as Kevlar™ or Spectra™ have not heretofore been obtained.

SUMMARY

An aspect of the invention is a method of making melt-spun highly oriented and crystalline thermoplastic filaments or fibers. The method includes extruding at least one thermoplastic polymer, or a polymer blend, to form molten filaments. The molten filaments are then passed through a liquid bath that maintains the molten filaments at a temperature between the glass transition temperature and the melting temperature of the thermoplastic polymer. The bath includes a guide around which to passes the filament, which is redirected toward a first feed driven roller. The bath, guide and feed roller induce some increased tension to form partially oriented, low crystalline precursor filaments. The partially oriented filaments exit the bath and are further drawn to form melt-spun highly oriented crystalline filaments having unexpectedly high values for tenacity and modulus, and relatively low elongation to break values.

Another aspect of the invention is a melt-spun highly oriented and crystalline thermoplastic polymer filaments or fibers having increased tenacity, lower elongation, and increased modulus. The thermoplastic polymers are selected from the group consisting of melt spinable thermoplastic polymers and blends of melt spinable thermoplastic polymers.

Another aspect of the invention is a textile material formed from yarns comprising melt-spun highly oriented and crystalline thermoplastic polymer filaments or fibers each having increased tenacity, lower elongation, and increased modulus compared to conventional melt-spun thermoplastic polymer filaments. The thermoplastic polymer filaments are selected from the group consisting of melt spinable thermoplastic polymers, and blends of melt spinable thermoplastic polymers. The textile material includes, but is not limited to, a woven fabric, knitted fabric, nonwoven fabric, or braided material.

DETAILED DESCRIPTION OF THE INVENTION

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art, and all such alternate embodiments, modifications, and improvements are within the scope of the present invention.

Figure 1:
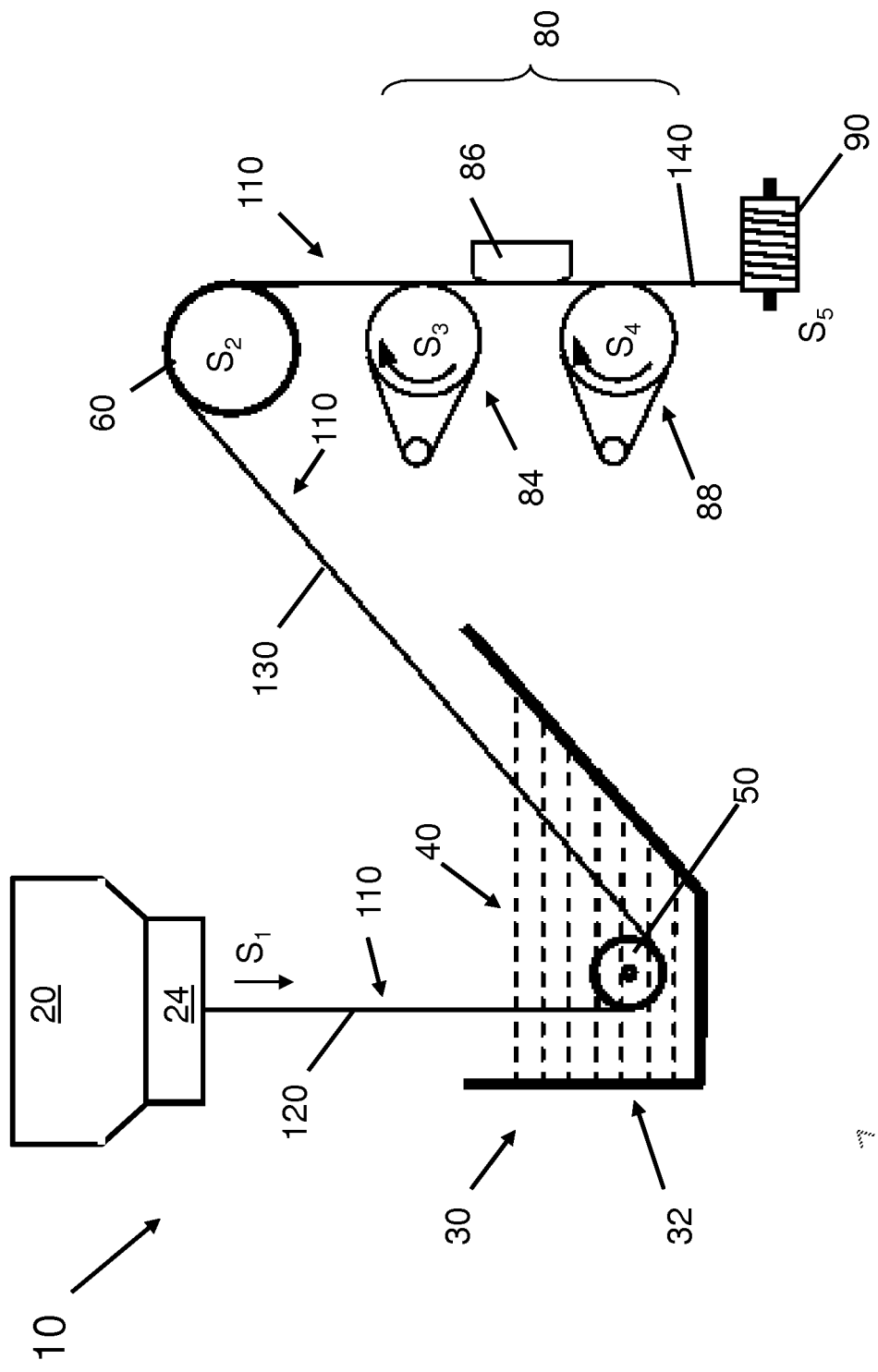
FIG. 1 shows a schematic of an exemplary system used to form thermoplastic filaments.

FIG. 1 shows a system 10 used to form the melt-spun highly oriented and crystalline thermoplastic filaments. The system 10 includes a spinneret 24, a horizontal liquid isothermal bath (HLIB) 30, and a drawing apparatus 80.

Figure 2:
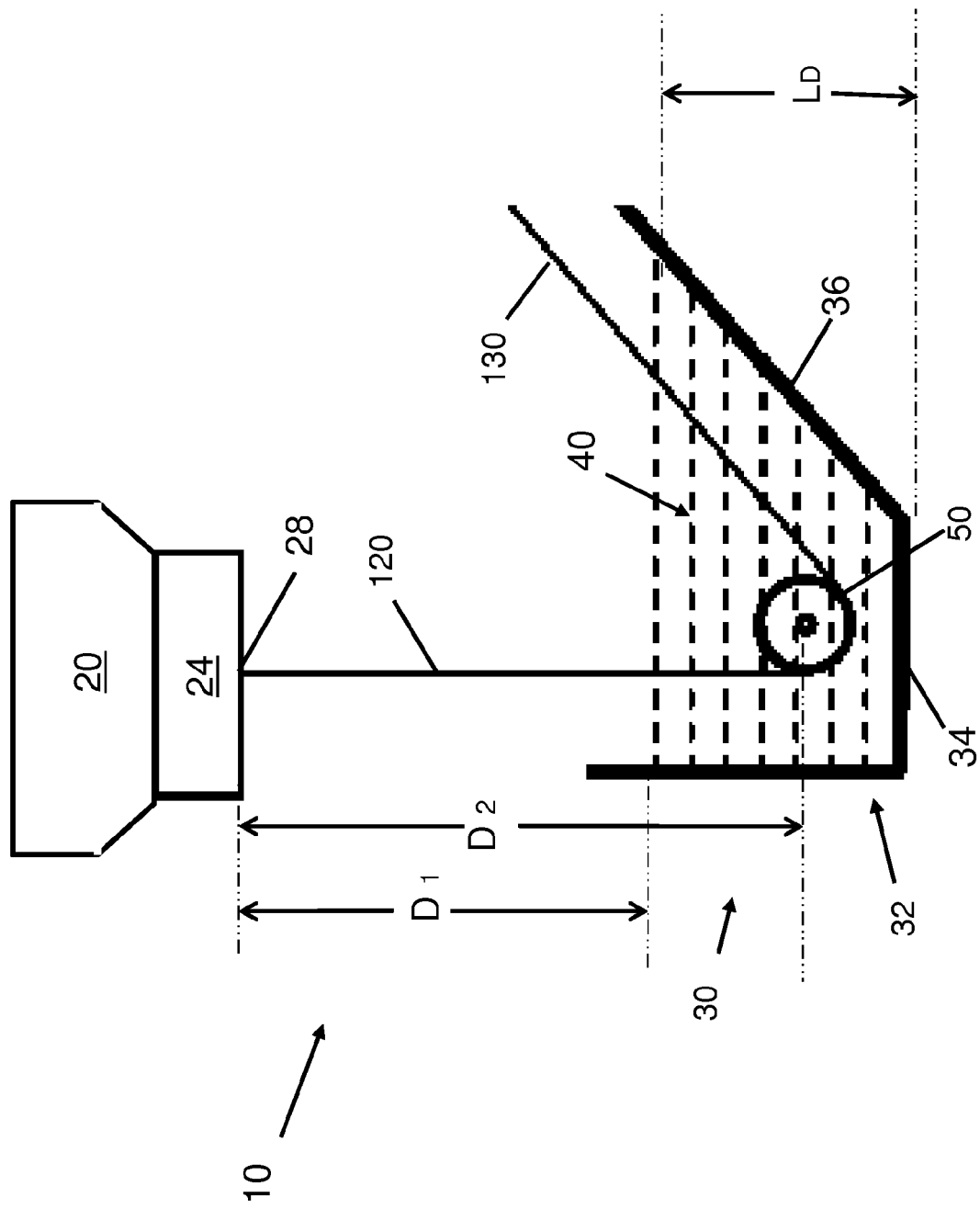
FIG. 2 shows a detailed view of the spinneret and an exemplary bath used to form thermoplastic filaments.

As shown in FIGS. 1 and 2, initially a thermoplastic polymer, or a blend of polymers, is extruded through the spinneret 24 to form a molten filament 120. The polymer is heated to a temperature sufficient to form a molten polymer within the extruder 20, as will be discussed in more detail below.

Referring now to FIG. 1, the molten filament 120 is then introduced to a bath 30 that contains a heated medium 40 and a stationary guide 50. The bath 30 refers to the horizontal liquid isothermal bath (HLIB), and includes a vessel 32, a medium 40 and a static guide 50. The guide 50 redirects the molten filament 120 toward a driven roller 60 outside the HLIB 30. The driven roller 60, which has a rotational speed that exceeds the speed in which the filament exits the spinneret (i.e., the as-spun speeds), and the HLIB 30 induce further orientation of the filament to form the partially oriented precursor filaments 130, as will be described below. The partially oriented filament 130 then passes through a further drawing step to form the highly oriented and crystalline filaments 140.

Continuing with FIG. 1, the temperature, tension, and time the filament is exposed to the medium 40 and forms a partially oriented filament with a lamellar, amorphous but still oriented morphology, but also having low or essentially zero crystallinity. The bath 30 is maintained at an elevated temperature, and along with guide 50 and roller 60 induces tension to the filament along the threadline 110, as will be further described below. As the partially oriented filament enters the subsequent drawing stage of the process, a filament is formed with highly oriented, crystalline fibrillar morphology. Thus, subsequent drawing further orients the amorphous regions while also forming crystalline regions in the filament while using relatively low draw ratios.

As shown in FIG. 1, an extruder 20 and spinneret 24 are used to form the molten filament 120. A molten filament refers to a filament exiting an orifice that has not been quenched, set, annealed or heat-set. Thermoplastic polymer chips are initially dried to remove moisture (the drying apparatus not shown) and introduced to the extruder 20 as is known in the art. The extruder 20 forces the polymer chips through zones of gradually increasing temperature toward the spinneret 24. The temperatures in the extruder 20 are dependent on the polymer or polymer blends to processed therein. For example, the extruder temperatures may be between about 200° C. and about 350° C. when using polyethylene naphthalate (PEN) and/or polyethylene terephthalate (PET).

In an embodiment, a single-screw extruder with a four zone temperature control is used to introduce the molten polymer to the spinneret 24. The number of zones may be modified as the need may arise. In an embodiment, a twin-screw extruder with multiple heating zones is used. In alternate embodiments, multiple extruders may be used when spinning more than one polymer or polymer blend. For example, multiple extruders may be used to form bicomponent thermoplastic filaments. In other alternate embodiments, one extruder is used to melt one polymer and a second extruder is used to melt a second polymer. For example, a first extruder is used to form polyester filaments while a second extruder is used to simultaneously form co-polyester filaments.

Referring to FIGS. 1 and 2, the spinneret 24 has an inner profile and an orifice 28 through which the molten polymer exits to form the molten filament 120. The inner profile may be configured to induce elongational flow of the molten polymer at or near the orifice 28 to facilitate forming a molten filament 120. A preferred spinneret 24 uses a hyperbolic inner profile, e.g., a hyperbolic die. In alternate embodiments, the spinneret 24 can have a pseudo-hyperbolic, conical or cylindrical inner profile. However, any inner profile may be used.

Continuing with FIGS. 1 and 2, the spinneret orifice 28 can have a variety of shapes to form the molten filament 120. In the embodiment shown in FIG. 1, the orifice 28 has a circular perimeter (not shown) that forms a filament with a circular cross-section. In an exemplary embodiment, the orifice 28 has an inner diameter less than about 1.0 mm, preferably between about 0.3 mm and 0.6 mm. In alternate embodiments, the orifice 28 can have any size. Further orifices may have shapes as needed. For example, the orifice may be trilobal, triangular, square, ribbon, cross, oval, kidney bean, or multi-lobed.

In another exemplary embodiment, the spinneret may be configured with the appropriate spinpacks to form bicomponent filaments. For example, the extruder 20 and spinneret 24 can be configured to form bicomponent filaments such as islands-in-the-sea, segmented pie, side-by-side, sheath-core, or other configurations.

The temperature of the spinneret 24 is dependent on the polymer or polymer blend being used to form the molten filaments. As described above, any thermoplastic polymer or polymer blend may be used. For example, when melt-spinning polyethylene naphthalate is used, the spinneret temperature is between about 275° C. and about 350° C., preferably about 310° C. When polyethylene terephthalate is used, the spinneret temperature is between about 240° C. and about 330° C.

Referring again to FIG. 1, the molten filament 120 exits the spinneret 24 at a first, or as-spun speed ($S_1$). The as-spun speed is between about 1000 m/min to about 5000 m/min. However, the as-spun speeds may be higher than 5000 m/min.

In an embodiment, polyethylene naphthalate filaments have been formed at as-spun speeds of about 3000 m/min. In other embodiments, polyethylene terephthalate filaments have been formed at as-spun speeds of about 3000 m/min.

Referring to FIGS. 1 and 2, the molten filament 120 travels along threadline 110 into the HLIB 30 around guide 50 and is redirected therein toward the first driven roll 60 positioned outside of the bath 30. The threadline refers to the path a filament travels during fiber formation. In an embodiment, the filament is redirected to a roller 60 elevated above the guide 50. As described above, the HLIB bath 30 further orients the molten filament 120 between the guide 50 and the first feed roll 60 by maintaining the temperature of the molten filament above the glass transition temperature of the polymer while inducing increased tension along the threadline 110. The extent of orientation obtained in the HLIB 30, however, depends on the temperature of the medium, the time the molten filament 120 is exposed to the medium 40, tension induced by the medium 40, position of guide 50, and the speed ($S_2$) of the first feed roll 60.

Referring now to FIG. 2, the HLIB 30 is a vessel 32 has a bottom surface 34, sides 36 and a medium 40 contained therein. The medium 40, as described above, may be heated to create an isothermal condition through which the molten filament 120 passes. In one embodiment, the medium is triethylene glycol. In other embodiments, ethylene glycol or diethylene glycol is used. Other fluids may be used, such as silicone fluids, an aqueous bath, or any other fluid with the proper physical, chemical and safety properties. The medium, in particular, is substantially a liquid when heated above the glass transition temperature of the polymer being melt-spun. The medium, however, can be any medium capable of remaining liquid when heated above the glass transition temperature of the polymer.

During processing, the temperature of the medium 40 is typically between the glass transition temperature ($T_g$) and the melting temperature ($T_m$) of the polymer or the polymer blends. In an embodiment, the temperature of the medium or liquid 40 is between about 50° C. and about 400° C. For example, when polyethylene naphthalate is used to form the filaments as described herein, the temperature of the liquid is between about 90° C. and about 250° C., preferably between about 100° C. and about 180° C. In embodiments where polyethylene terephthalate is used to form the filaments, the temperature of the liquid is between about 70° C. and about 200° C., preferably between about 80° C. and about 100° C. In embodiments where blended polymers are used, the temperature of the liquid may be modified accordingly.

Continuing with FIG. 2, the distance between the spinneret 24 and HLIB 30 can influence filament properties. The distance from the spinneret orifice 28 to the medium 40 in the vessel 32 should be small enough to minimize quenching of the molten filament 120, but sufficient to form a filamentary structure. As used herein, $D_1$, refers to the distance from the spinneret orifice 28 to the medium 40. In a preferred embodiment, $D_1$ is between about 20 cm and about 200 cm. Preferably the distance is about 115 cm.

The guide 50 is positioned in the HLIB 30 and redirects the filament toward the feed roller 60. As shown in FIGS. 1 and 2, the guide 50 is positioned a distance, $D_2$, below the orifice 28. The distance ($D_2$) is between about 10 cm and 180 cm. In the embodiment shown, the guide 50 is static and does not rotate with the filament. The molten filament 120 thus is dragged around a portion of the surface of the guide 50. The static guide 50 increases tension along the threadline 110. Further, the degree to which the filament is wrapped around guide 50 also impacts tension. A single guide 50 is shown in FIGS. 1 and 2. In alternate embodiments, however, several guides may be used. For example, a plurality of guides may be used when forming multiple filaments. Further, more than one guide, static or rotatable, may be used in the bath 30.

The depth of liquid 40 in the bath 30 is modified as needed. As shown in FIG. 2, the depth of the liquid ($L_D$) is measured from the bottom surface 34 of the vessel 32 to the top of the liquid 40. In an embodiment, the $L_D$ is sufficient to submerge the guide 50. Preferably, the $L_D$ is between about 5 cm and 50 cm.

A first driven feed roller 60 redirects the partially oriented filament 130 toward a drawing apparatus 80. The feed roller 60 is positioned externally of the HLIB 30 and at an elevation above the guide 50 in the bath 30. This position draws the filament at least partially around the guide 50 and in an upwardly direction from within the HLIB 30. In the embodiment shown in FIG. 1, the first feed roller 60 has a speed ($S_2$) incrementally larger than the as-spun speeds ($S_1$). Thus, the first feed roll 60 also increases tension along the threadline 110 in the HLIB 30 while directing the filaments toward a drawing apparatus 80.

The drawing apparatus 80 may be any configuration of rollers and a heat source that imparts thermal energy and extension to the partially oriented filaments to form the highly oriented and crystallized filaments 140. Because the partially oriented filaments have the unique oriented morphology as discussed above, relatively low or modest draw ratios provide a highly oriented and crystalline filaments 140 with the unexpected results described herein. Typically, draw ratios for conventional melt-spun filaments that do not use the HLIB as described herein are the region of 3.5 to 5 and yield physical properties that fall short of those described herein.

An embodiment of a drawing apparatus is shown in FIGS. 1 and 2. The drawing apparatus 80 includes first 84 and second 88 draw rollers positioned a distance apart from one another and a heat source 86 located therebetween. First and second draw rollers 84 and 88 have rotational speeds (rpm), $S_3$ and $S_4$, respectively. The ratio of $S_4$ to $S_3$ is referred to as the draw ratio. The draw ratio is indicative of the level orientation in a filament; the higher the draw ratio the more oriented the filament. In an embodiment, the rotational speed ($S_4$) is greater than or equal to rotational speed ($S_3$). Accordingly, the draw ratio is preferably between about 1.0 and 5.0, more preferably between about 1.0 and 2.0 to yield the highly oriented crystalline filaments. In particular, draw ratios of about 1.4 yield a highly oriented and crystalline structure that provide for high tenacity and modulus, and relatively low elongation as described herein. The speeds $S_3$ and $S_4$ should also be incrementally larger than the as-spun speed ($S_1$) and feed roll speed ($S_2$) when in-line drawing is used. However, the feed roll speed $S_2$ should approximate the first draw roll speed $S_3$. In alternate embodiments, a take-up roll collects filaments from the guide roll 60 and may be further drawn using an off-line process as needed. The speed of the take-up roll is thus larger than the spinneret speed, thus drawing the filament.

Drawing at the drawing step occurs between the glass transition temperature and the melting temperature of the thermoplastic polymer. In an embodiment, heat source 86 applies heat to the filament while differential speeds between the first 84 and second 88 rolls extend and crystallize the polymer chains. In addition, first 84 and second draw 88 rolls may be heated as the need may arise. The drawing temperatures for PEN are preferably between about 100° C. and 260° C. preferably about 160° C. The drawing temperatures for PET are between about 100° C. and 260° C., preferably about 160° C. The drawing temperatures, however, may range between about 50° C. and about 400° C.

As shown in FIG. 1, the drawn filaments 140 are wound onto a package as they exit the drawing apparatus 80. Winding speeds i.e., take-up speeds, can range between 1000 m/min and 5000 m/min and are at least equal to the speed ($S_4$) of the second draw roll 88, as described above. Winding speeds may also range between 1000 m/min and 10000 m/min. In alternate embodiments, the partially drawn filament 130 is passed over guide roller 60 and wound directly onto a package, which is then exposed to an off-line drawing process as described above. In other embodiments, one or more additional godets or accumulators can be used to accumulate filaments prior to take-up and/or the second drawing steps. Such additional rollers permit variations in the take-up speeds as described herein.

Figure 3:
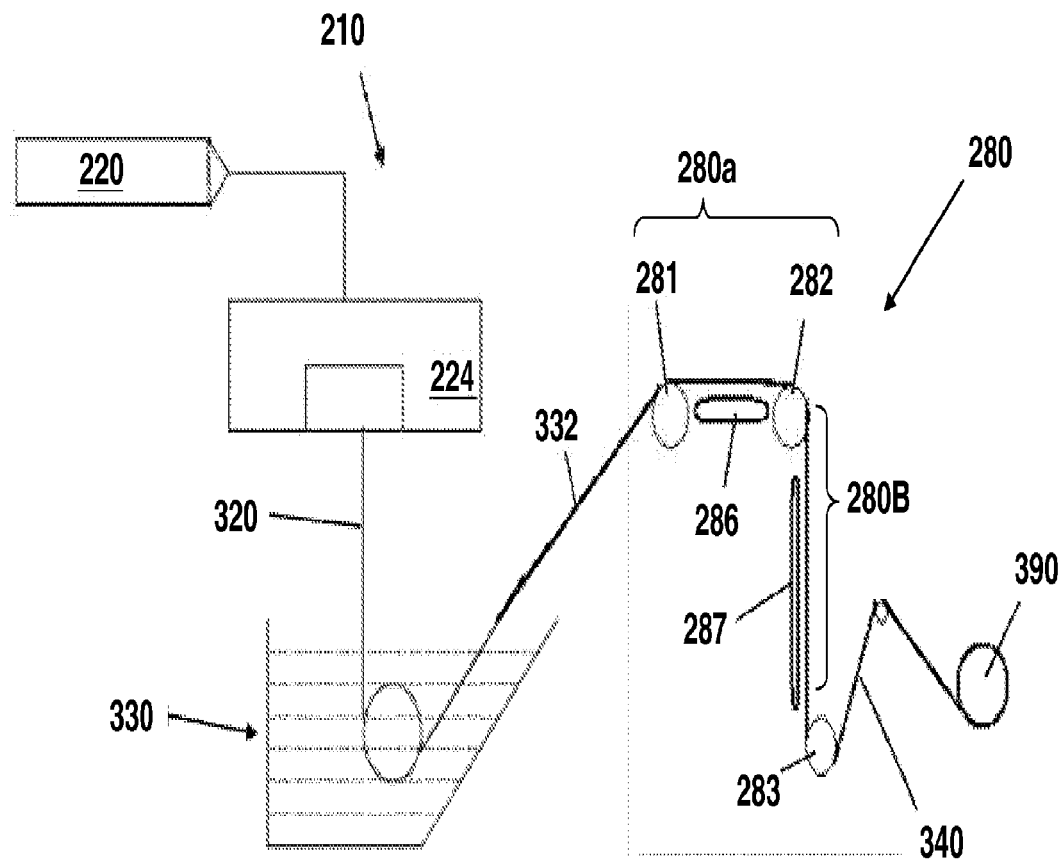
FIG. 3 shows another exemplary embodiment of the system used to form thermoplastic filaments.

As shown in FIG. 3, in other embodiments, the drawing apparatus 280 includes first 280A and second 280B draw steps. As can be seen in FIG. 3, the extruder 220 and spinneret 224 form a molten filament 320 that is passed through the HLIB 330 toward the drawing apparatus 280. A partially oriented filament 332 engages first draw step 280A at first feed roller 281, and passes over first heating source 286 to the second draw roller 282. The filament then passes over the second heating source 287 toward the third 283 draw roller. The filament may therefore be drawn between the first 281 and second 282 rollers and also between the second 282 and third 283 draw rollers to form a highly oriented and crystalline filament 340. A take up roll 390 winds up the highly oriented and crystalline filament 340.

In other alternate embodiments, the air drawing may be used. For example, high velocity heated air may be used to extend the partially oriented filaments to form highly oriented and crystalline filaments.

Figure 4:
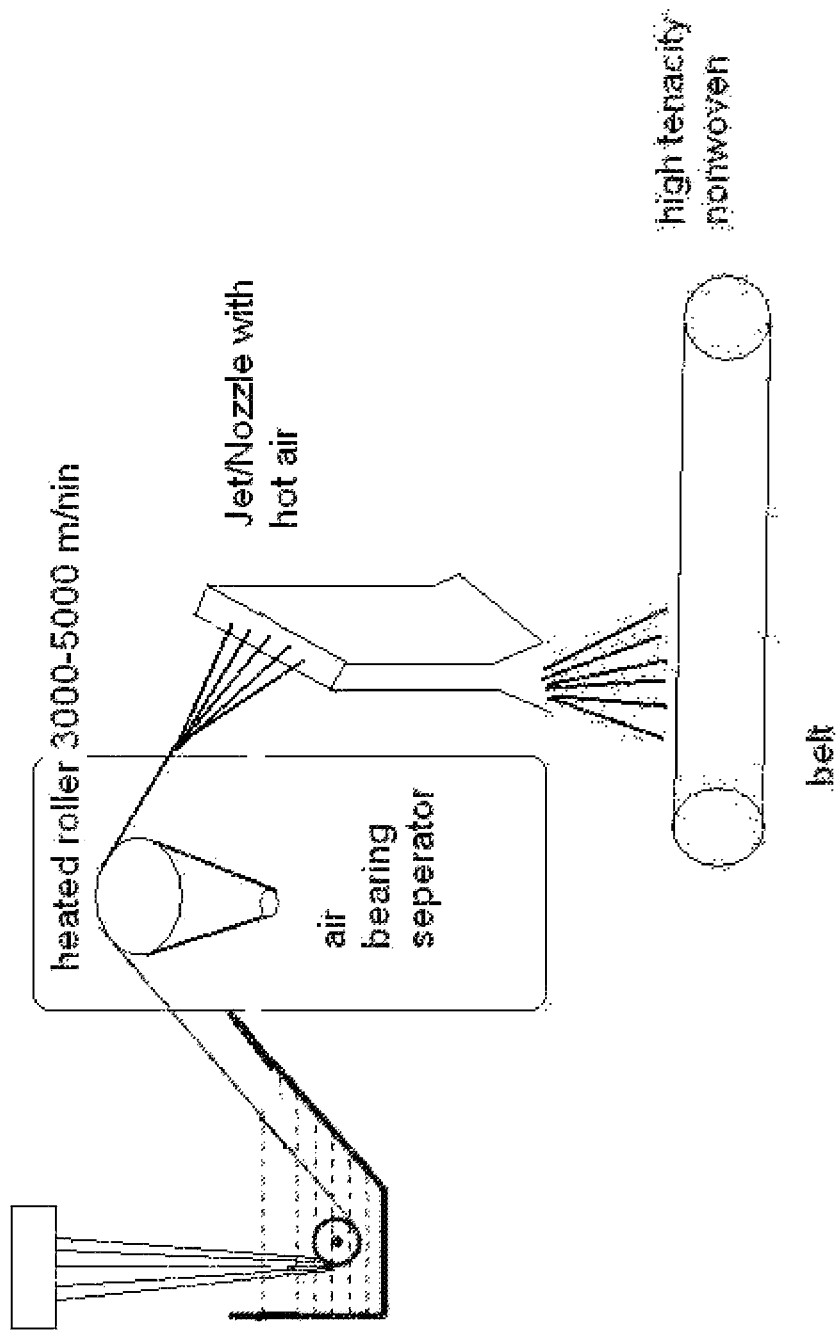
FIG. 4 shows a schematic of an exemplary system used to form a melt-spun nonwoven.

Further, the highly oriented and crystalline filaments may be used to form a nonwoven, e.g. melt-spun nonwovens. As shown in FIG. 4, the HLIB can be used in conjunction with a melt-spun process to form highly oriented and crystalline spunbond fabrics. For example, the partially oriented precursor filaments are introduced to high velocity heated air forced through jets and/or nozzles. The forced air draws and orients the precursor filaments to form oriented and crystalline filaments that are deposited onto a moving belt to form a spunbond nonwoven. Any chemical or mechanical bonding system may be used in downstream processing to consolidate the oriented and crystalline filaments and form the melt-spun fabric.

Thermoplastics polymers and blends thereof are used to form the high tenacity, high modulus filaments. Thermoplastic polymers that have a definable glass transition ($T_g$) and melting ($T_m$) temperatures are preferable. Polymers that have low, medium, or high intrinsic viscosities (IV) can yield high tenacity and high modulus filaments when melt-spun as described herein. For example, a polymer having an intrinsic viscosity between about 0.75 and about 1.0 dl/g can be used. Preferable thermoplastic polymers include polyethylene terephthalate (PET) and polyethylene naphthalate (PEN). In alternate embodiments, other thermoplastic polymers can be used including, but not limited to, PET, PEN, polytrimethylene terephthalate (PTT), polybutylene terephthalate (PBT), polypropylene (PP), polylactic acid (PLA), polyamide 6 (PA6), polyamide 6,6 (PA66), polyethylene, and co-polymers of PET, PEN and PA or any of the polymers listed above. In other embodiments, recycled polymers may be used.

Blends of polymers may also be used to form the highly oriented and crystalline filaments as described herein. For example, two or more polymers including, but not limited to, PET, PEN, PTT, PBT, PP, PLA, PA6, PA66, PE co-polymers of PET, co-polymers of PEM, and co-polymers of PA may be used to form the highly oriented and crystalline filaments. In other embodiments, one or more polymers may be combined with a recycled polymer. In an embodiment, polymer blends can comprise between about 0.01% and 50% by weight of a first polymer and between about 50% and 99.99% by weight of a second polymer. For example, one blend comprises about 99% by weight of PEN and about 1% by weight of PET. In another embodiment, the blend comprises about 99% by weight of PEN and about 1% by weight of PP.

In other embodiments various additives may be combined with a polymer or polymer blends. Additives may include, but are not limited to, nonionic melt additives, hydrophobic additives, hydrophilic additives, polymer combatablizers, plasticizers, UV enhancers, calcium carbonate, flame retardants, intumescents, fluorochemicals, antibacterial agents, antifungal agents, heat and light stabilizers, delustrants such as titanium dioxide, dyes, pigments, carbon particles, carbon nanoparticles, carbon nanotubes, and other nanoparticles.

The melt-spun highly oriented and crystalline thermoplastic filament or fibers as described herein may have a range of deniers. In an embodiment, the denier of the fiber or filament may by up to about 100 denier. In some exemplary embodiments, the denier per filament (dpf) may range between about 0.01 dpf to 10 dpf and higher. Further, multifilament yarns formed as described herein may have any range of denier and denier per filament as is needed.

The filaments formed as described herein may be used to manufacture a variety of textile materials. The filaments are capable of forming continuous filament yarns, textured continuous filament yarns, core-spun yarns or other yarn structures. In alternate embodiments, the drawn filaments can be collected and cut into staple fibers, crimped and used to form spun yarns, e.g., ring-spun and/or open end spun yarns. In other embodiments, the fibers may be used to form nonwoven fabrics. The filaments or spun yarns may therefor be used to form woven fabrics, weft knit fabrics, warp knit fabrics, three dimensional braids, 3D woven structures, composites and the like.

Example 1

PEN polymer chips having intrinsic viscosity (IV) of 1.0 dl/g was used to form filaments. The intrinsic viscosity was measured in a 60/40 w/w phenol/tetrachloroethane solution. The PEN polymer chips were vacuum dried at 140° C. for 16 hours. A Fourne single-screw extruder, equipped with a single-hole, hyperbolic spinneret with 0.6 mm orifice diameter was used for melt-extrusion and spinning. The spinneret temperature was set at 310° C. After emergence from the spinneret, the filament was directed into a horizontal liquid isothermal bath and around a guide therein toward take-up. The HLIB was positioned 110 cm below the spinneret ($D_1$). The liquid depth ($L_D$) was fixed at 25 cm. The as-spun speed was 4000 m/min. The temperature of the liquid was 135° C. The fibers were spun and passed through the HLIB to form partially oriented filaments. The filaments were collected and then heat-drawn off line on a modified Instron machine to approximate the drawing step described above. The modified Instron tensile testing machine has two opposing clamps and a 60 cm long heating tube positioned therebetween. The fibers spun with the HLIB were then placed within the 60 cm heating tube and secured to each clamp. The temperature of the heating tube was set to 160° C. One of two clamps traveled at 5 cm/min. The fibers were drawn to a draw ratio of 1.4.

Example 2

PET polymer chips having an intrinsic viscosity (IV) of 1.0 dl/g were used to form the filaments. The intrinsic viscosity was measured in a 60/40 w/w phenol/tetrachloroethane solution. The PET polymer chips were vacuum dried at 140° C. for 16 hours. A Fourne single-screw extruder, equipped with a single-hole, hyperbolic spinneret with 0.6 mm orifice diameter was used for melt-extrusion and spinning the PET. The spinneret temperature was set at 290° C. After emergence from the spinneret, the filament was directed into a HLIB and around a guide therein toward take-up. The HLIB was positioned 110 cm below the spinneret ($D_1$). The liquid depth ($L_D$) was fixed at 25 cm. The spinning speed ($S_1$) was 2000-3000 m/min. The take-up was 4000 m/min. The temperature of the liquid was 80° C. The fibers were spun and passed through the HLIB to form partially oriented filaments. The filaments were collected and then heat-drawn off line on a modified Instron machine to approximate the drawing step described above. The modified Instron tensile testing machine has two opposing clamps and a 60 cm long heating tube positioned therebetween. The fibers spun with the HLIB were then placed inside the 60 cm heating tube and secured to each clamp. The temperature of the heating tube was set to 120° C. One of the two clamps traveled at 5 cm/min. The fibers were drawn to a draw ratio of 1.4.

Wide-angle X-ray diffraction (WAXD) measurements were performed on PEN polymers using a Siemens type-F diffractometer system with CuK$\alpha$ radiation generated at 30 kV and 20 mA. Measurements were taken on undrawn and drawn filaments. The diffracting intensities were recorded every 0.1° from 2$\theta$ scans in the range 5-40°. Density of filament samples was measured by using a density gradient column consisting of aqueous sodium bromine maintained at 23±0.1° C. Tensile properties of fibers were measured on an MTS testing machine following ASTM D3822. A gauge length of 25.4 mm and a constant cross-head speed of 15 mm/min were used. The crystallinity, or the weight fraction crystallinity, $X_{c,wt}$, is calculated from density by applying the following equation:

$$X_{c,wt} = \frac{(\rho - \rho_a^0)\rho_c^0}{(\rho_c^0 - \rho_a^0)\rho}$$

Where $\rho$ is the density of the fiber, $\rho_c^0$ is the density of the crystalline phase and $\rho_a^0$ is the density of the amorphous phase.

Table 1 shows the properties of the PEN fibers formed with and without the HLIB, and with and without a subsequent drawing step. A draw ratio (DR) of 1.40 resulted in increased tenacity and modulus as well as decreased elongation. However, the HLIB filaments show a greater improvement in fiber properties after drawing. The PEN fibers have high tenacity (10.75 g/d), and high modulus (216.7 g/d) at a low draw ratio (1.40). The data also indicates that the HLIB fibers have a unique morphology. The undrawn HLIB fibers have a low density and appear totally amorphous. The undrawn HLIB reported a crystallinity of zero as shown in Table 1. This is surprising because the undrawn HLIB fibers also have higher tenacity than the undrawn fibers formed without the HLIB.

TABLE 1

| Fiber sample | | Tenacity (g/d) | Modulus (g/d) | Elongation (%) | Crystallinity* (%) |
|---|---|---|---|---|---|
| Undrawn | No HLIB | 5.35 | 126.2 | 11.7 | 27.0 |
| | HLIB | 7.27 | 114.5 | 12.8 | 0 |
| Drawn | No HLIB | 7.31 | 173.0 | 8.7 | 35.2 |
| (DR = 1.40) | HLIB | 10.75 | 216.7 | 7.6 | 49.6 |

*The crystallinity is calculated by using density data

Figure 5:
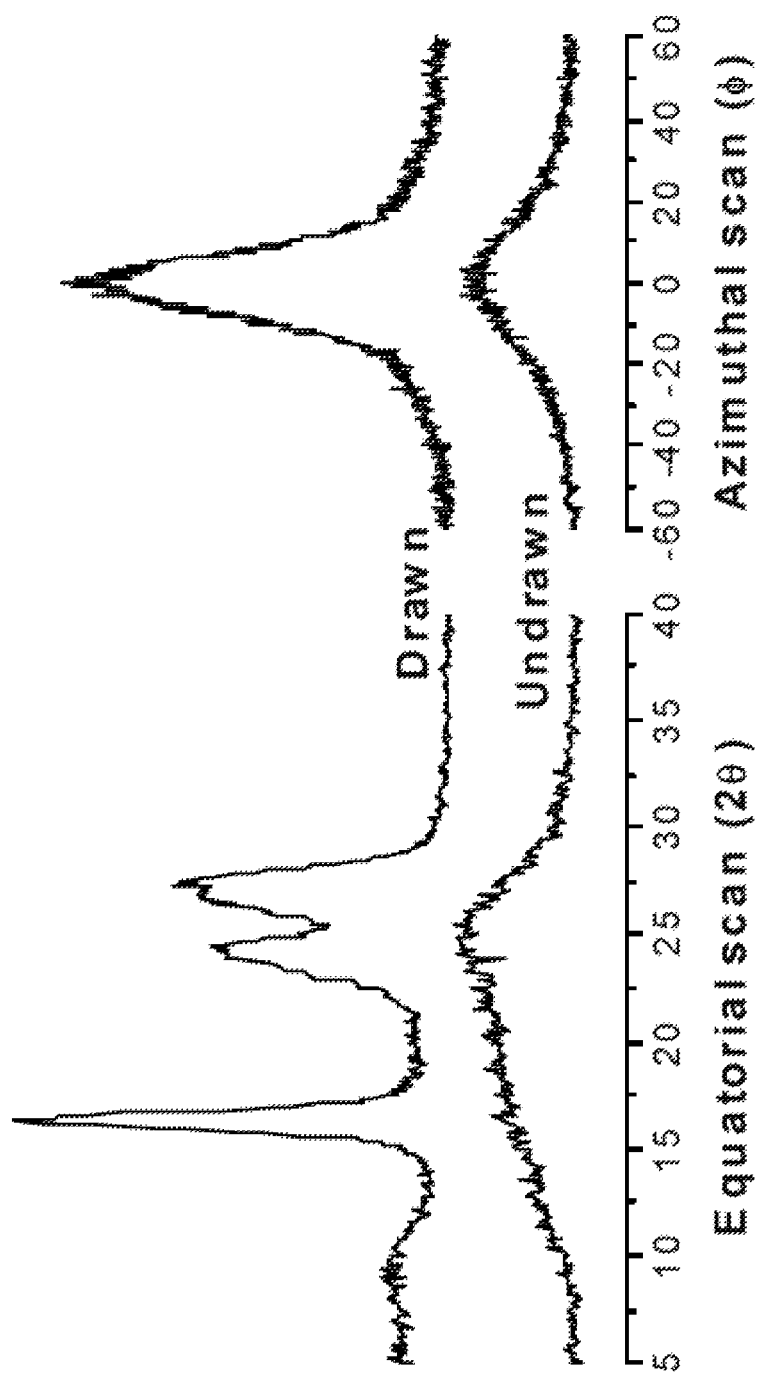
FIG. 5 shows a graph representative of polymer orientation at various stages in the system.

WAXD profiles of the undrawn and drawn PEN fibers spun with HLIB are shown in FIG. 5. Wide angle X-ray diffraction (WAXD) indicates that the HLIB fibers have an oriented amorphous phase with crystalline regions. Interestingly, the equatorial X-ray diffraction profile of the HLIB undrawn fibers is diffuse, indicating an amorphous feature. In contrast, the drawn fibers show distinct crystal peaks and adopt the a modification. The azimuthal scan is also shown in FIG. 5 for a characterization of chain orientation. The drawn fibers show a sharp and strong peak in the azimuthal scan, suggesting a well developed polymer chain orientation. At the same time, the undrawn fibers spun with HLIB show a mild peak in the azimuthal scan that suggests a certain extent of chain orientation. This data indicates that the HLIB undrawn fibers of PEN show an amorphous but oriented feature, which turns into a highly crystallized and oriented morphology when drawn.

Table 2 summarizes the physical properties of PET and PEN filaments formed using the HLIB compared to commercially available PET and PEN filaments. Sample A is the commercial, non HLIB PET filament ("PET COM"). Sample B is a PET filament that was melt-spun using the HLIB ("PET HLIB"). Sample C is the commercial, non HLIB PEN filament ("PEN COM"). Sample D is a PEN filament that was melt-spun using the HLIB ("PEN HLIB"). Filaments spun using the HLIB (samples B and D) show dramatic improvements in physical properties over the non-HLIB filaments (samples A and C).

TABLE 2

| Sample | Tenacity (g/d) | Modulus (g/d) | Elongation (%) |
|---|---|---|---|
| A (PET com) | 9.2 | n/a | 14.0 |
| B (PET HLIB) | 11.4 | n/a | 9.0 |
| C (PEN com) | 9.5 | 156.7 | 12.8 |
| D (PEN HLIB) | 12.3 | 217.2 | 7.0 |

Tables 1 and 2 are representative of PET and PEN polymers used to form the highly oriented crystalline filaments as described herein. Other polymers may be used to form highly oriented crystalline filaments having lower tenacity values than those reported in Tables 1 and 2, yet would have increased tenacity and modulus of similar polymer types processed without the HLIB and subsequent drawing step.

Exemplary embodiments of the invention have been described herein, however the invention is not limited to Examples 1 and 2 set forth above. The highly oriented and crystalline filaments as described herein may have a tenacity of at least 10 g/d, an elongation less than about 15%, and a modulus of at least about 130 g/d, when measured as described above. Further, in an embodiment, polyethylene terephthalate filaments may have a tenacity of at least about 11 g/d, an elongation less than about 10%, and a modulus of at least 130 g/d. Polyethylene terephthalate filaments or fibers have a crystallinity of at least between about 45% and 60%, when measured as described above. In other embodiments, polyethylene naphthalate filaments or fibers have a tenacity of at least about 10 g/d, an elongation less than about 10%, and a modulus of at least about 200 g/d. Further, polyethylene naphthalate filaments have a crystallinity of between about 45% and about 52%, when measured as described above.

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A method of making melt-spun highly oriented and crystalline filaments or fibers comprising:
   extruding at least one thermoplastic polymer from a spinneret to form at least one molten filament; and
   drawing the at least one molten filament that has not been quenched by passing the at least one molten filament from the spinneret directly into and through a liquid bath to induce tension on the at least one molten filament sufficient to form an at least one partially oriented filament, whereby the temperature of the liquid bath is between the glass transition temperature and the melting temperature of the at least one thermoplastic polymer.

2. The method of claim 1, wherein the at least one thermoplastic polymer is selected from a group consisting of polyethylene terephthalate, polyethylene naphthalate, polytrinethylene terephthalate, polybutylene terephthalate, polypropylene, polylactic acid, polyamide 6, polyamide 6,6, polyethylene and co-polymers thereof.

3. The method of claim 1, wherein the at least one thermoplastic polymer is a polymer blend of two or more polymers.

4. The method of claim 1, wherein the at least one molten filament is formed at an extrusion speed between about 1000 m/min and about 5000 m/min.

5. The method of claim 1, wherein the bath contains submerged therein at least one static guide, the at least one molten filament is passed around a portion of the at least one static guide.

6. The method of claim 1, wherein the bath is heated to between about 50° C. and about 400° C.

7. The method of claim 1, wherein the bath is a medium that remains substantially a liquid when heated to between the glass transition temperature and the melting temperature of the at least one thermoplastic polymer.

8. The method of claim 1, further comprising further drawing the at least partially oriented filament by directing the at least partially oriented filament through a first set of draw rollers and a second set of draw rollers positioned a distance from the first set of draw rollers, wherein a heat source between the first and second set of draw rollers heats the partially oriented filament to a temperature between about 50° C. and about 400° C.

9. The method of claim 8, wherein the further drawing step has a take-up speed greater than the extrusion speed and between about 1000 m/min and about 5000 m/min.

10. The method of claim 8, wherein the further drawing step has a take-up speed greater than the extrusion speed and between about 1000 m/min to about 10000 m/min.

11. The method of claim 8, wherein the further drawing step occurs outside of the bath.

12. The method of claim 8, wherein the further drawing step comprises extending the at least one partially oriented filament to a draw ratio between about 1.0 to about 2.0 to form the at least one melt-spun highly oriented and crystalline filament.

13. The method of claim 8, wherein the further drawing step comprises extending the at least one partially oriented filament to a draw ratio up to about 2.0 to form the at least one melt-spun highly oriented and crystalline filament.

14. The method of claim 8, wherein the melt-spun highly oriented and crystalline filament has a tenacity of at least about 10 g/d, an elongation of less than about 15%, and a modulus of at least about 130 g/d.

15. The method of claim 8, wherein the thermoplastic filament or fiber is polyethylene terephthalate having a tenacity of at least about 11 g/d, an elongation less than about 10%, and a modulus of at least about 130 g/d.

16. The method of claim 8, wherein the thermoplastic filament or fiber is polyethylene naphthalate having a tenacity of at least about 10 g/d, an elongation less than about 10%, and a modulus of at least about 200 g/d.

17. The method of claim 8, wherein the thermoplastic filament or fiber is polyethylene terephthalate having a crystallinity between about 45% and 60%.

18. The method of claim 8, wherein the thermoplastic filament or fiber is polyethylene naphthalate having a crystallinity between about 45% and 52%.

19. A method of making highly oriented and crystalline thermoplastic filaments comprising:
 extruding at least one thermoplastic polymer from a spinneret to form at least one molten filament;
 performing a first drawing step of the at least one molten filament that has not been quenched by passing the at least one molten filament from the spinneret directly into and through a horizontal liquid isothermal bath while the at least one molten filament is at a first temperature between the glass transition temperature and the melting temperature to induce tension on the at least one molten filament sufficient to form at least one partially oriented filament; and
 performing a second drawing step on the at least one partially oriented filament at a second temperature to form the highly oriented and crystalline filament.

20. The method of claim 19, wherein the at least one thermoplastic polymer is selected from a group consisting of polyethylene terephthalate, polyethylene naphthalate, polytrinethylene terephthalate, polybutylene terephthalate, polypropylene, polylactic acid, polyamide 6, polyamide 6,6, polyethylene and co-polymers thereof.

21. The method of claim 19, wherein the at least one thermoplastic polymer is a polymer blend of two or more polymers.

22. The method of claim 19, wherein the at least one molten filament is formed at an extrusion speed between about 1000 m/min and about 5000 m/min.

23. The method of claim 19, wherein the at least one molten filament is formed at an extrusion speed between about 1000 m/min and about 10000 m/min.

24. The method of claim 19, wherein the bath contains submerged therein at least one static guide, the at least one molten filament is passed around a portion of the at least one static guide.

25. The method of claim 19, wherein the bath is heated to between about 50° C. and about 400° C.

26. The method of claim 19, wherein the bath is a medium that remains substantially a liquid when heated to between the glass transition temperature and the melting temperature of the at least one thermoplastic polymer.

27. The method of claim 19, wherein the second drawing step further comprises a first set of draw rollers and a second set of draw rollers positioned a distance from the first set of draw rollers, and a heat source between the first and second set of draw rollers for heating the partially oriented filament to a temperature between about 50° C. and about 400° C., the partially oriented filament being drawn between the first and second set of draw rollers.

28. The method of claim 19, wherein the second drawing step has take-up speed greater than the extrusion speed and between about 1000 m/min and about 10000 m/min.

29. The method of claim 19, wherein the second drawing step occurs outside of the bath.

30. The method of claim 19, wherein the second drawing step further comprises extending the at least one partially oriented filament to a draw ratio up to about 2.0 to form the at least one melt-spun highly oriented and crystalline filament.

31. The method of claim 19, wherein the melt-spun highly oriented and crystalline filament has a tenacity of at least about 10 g/d, an elongation of less than about 15%, and a modulus of at least about 130 g/d.

32. The method of claim 19, wherein the thermoplastic filament or fiber is polyethylene terephthalate and having a tenacity of at least about 11 g/d, an elongation less than about 10%, and a modulus of at least about 130 g/d.

33. The method of claim 19, wherein the thermoplastic filament or fiber is polyethylene naphthalate and having a tenacity of at least about 10 g/d; an elongation less than about 10%, and a modulus of at least about 200 g/d.

34. The method of claim 19, wherein the thermoplastic filament or fiber is polyethylene terephthalate having a crystallinity of at least between about 45% and 60%.

35. The method of claim 19, wherein the thermoplastic filament or fiber is polyethylene naphthalate having a crystallinity of at least between about 45% and 52%.

36. The method of claim 1, further including further drawing said at least partially oriented filament to further orient the partially oriented filament.

37. The method of claim 1, wherein the bath is a horizontal liquid isothermal bath.

38. The method of claim 1, wherein the drawing step comprises passing the at least one molten filament through the liquid bath at a speed that is greater than the at least one molten filament extrusion speed.

39. The method of claim 1, further comprising directing the at least one molten filament through the liquid bath and to a drive roll outside of the liquid bath, wherein the drive roll has a rotational speed that exceeds the at least one molten filament extrusion speed.

40. The method of claim 4, wherein the drawing step comprises passing the at least one molten filament through the liquid bath at a speed that is greater than the extrusion speed.

41. The method of claim 19, wherein the first drawing step comprises passing the at least one molten filament through the liquid bath at a speed that is greater than the at least one molten filament extrusion speed.

42. The method of claim 19, wherein the first drawing step further comprises directing the at least one molten filament through the liquid bath and to a drive roll outside of the liquid bath, wherein the drive roll has a rotational speed that exceeds the at least one molten filament extrusion speed.

43. The method of claim 22, wherein the first drawing step comprises passing the at least one molten filament through the liquid bath at a speed that is greater than the extrusion speed.

44. The method of claim 1, wherein the drawing step comprises drawing the at least one molten filament by passing the at least one molten filament from the spinneret over a distance sufficient to form a filamentary structure capable of being drawn without quenching, setting, annealing or heat-setting the at least one molten filament directly into and through a liquid bath to induce tension on the at least one molten filament sufficient to form an at least one partially oriented filament, whereby the temperature of the liquid bath is between the glass transition temperature and the melting temperature of the at least one thermoplastic polymer.

* * * * *